(12) United States Patent
Jacques et al.

(10) Patent No.: US 7,197,430 B2
(45) Date of Patent: Mar. 27, 2007

(54) METHOD AND APPARATUS FOR DETERMINING ENGINE PART LIFE USAGE

(75) Inventors: Kenneth Willson Jacques, West Chester, OH (US); Mark Gerard Butz, Loveland, OH (US); Edmund Hall Hindle, III, West Chester, OH (US); Robert Hugh Van Stone, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/126,100

(22) Filed: May 10, 2005

(65) Prior Publication Data

US 2006/0265183 A1    Nov. 23, 2006

(51) Int. Cl.
*G06F 11/30* (2006.01)
*G06F 19/00* (2006.01)

(52) U.S. Cl. ...................... 702/184; 701/100
(58) Field of Classification Search ................ 702/184, 702/182; 701/100, 29, 14, 30
See application file for complete search history.

(56) References Cited

U.S. PATENT DOCUMENTS

| | | | |
|---|---|---|---|
| 4,215,412 A | 7/1980 | Bernier et al. | |
| 5,080,496 A | 1/1992 | Keim et al. | |
| 5,276,891 A | 1/1994 | Patel | |
| 5,489,829 A | 2/1996 | Umida | |
| 5,689,066 A | 11/1997 | Stevenson | |
| 6,343,251 B1* | 1/2002 | Herron et al. | 701/100 |
| 6,449,565 B1* | 9/2002 | Budrow et al. | 702/42 |
| 6,539,783 B1 | 4/2003 | Adibhatla | |
| 6,756,908 B2* | 6/2004 | Gass et al. | 340/679 |
| 6,845,306 B2* | 1/2005 | Henry et al. | 701/29 |
| 6,871,160 B2* | 3/2005 | Jaw | 702/182 |

\* cited by examiner

*Primary Examiner*—John Barlow
*Assistant Examiner*—Toan M. Le
(74) *Attorney, Agent, or Firm*—William Scott Andes; Armstrong Teasdale LLP

(57) ABSTRACT

A method for determining an engine part life usage of a gas turbine engine life limited part used on an aircraft. The method includes operating a gas turbine engine that includes a plurality of rotating components and a plurality of sensors configured to monitor a plurality of gas turbine engine operating parameters, obtaining outputs from the plurality of sensors, and utilizing at least some of the outputs to calculate the life usage of at least one life limited part to facilitate tracking the life-usage of an individual life limited part on the gas turbine engine that is consumed on a flight by flight basis.

20 Claims, 5 Drawing Sheets

METHOD AND APPARATUS FOR DETERMINING ENGINE PART LIFE USAGE

BACKGROUND OF THE INVENTION

This application relates generally to gas turbine engines and, more particularly, to a method and apparatus for monitoring gas turbine engine Life Limited Parts (LLP).

At least some known gas turbine engines include a fan, a compressor, a combustor, a high pressure turbine, a low pressure turbine, and at least one shaft, wherein at least one of the fan, the compressor, and the high and low pressure turbines typically include a plurality of disks, spools, that are included in the list of LLP for the gas turbine engine.

Moreover, at least some known gas turbine engines are installed in an aircraft to provide the propulsion force necessary to operate the aircraft during all flight conditions. To facilitate reducing the probability that a gas turbine engine life limited part will fail during flight conditions, guidelines have been promulgated that instruct the maintenance personnel to condition, inspect and/or replace the engine life limited part after the engine life limited part has been operated for a predetermined quantity of cycles or hours.

More specifically, life tracking of turbofan engine life limited parts such as, a high pressure turbine rotor, is performed using a plurality of engine parameters such as, measured temperatures, pressures, speeds and/or various other engine parameters, that are recorded at specific engine operating conditions. This engine data is typically gathered on a fleetwide basis, and processed to define average flight conditions, and to calculate life limited part stress levels, temperatures and lives for each engine life limited part.

For example, at least one known aircraft utilizes a data recorder to facilitate collecting and recording a selected portion of the engine data. Moreover, on at least one known commercial aircraft, engine data is collected using a data recorder commonly referred to as a Quick Access Recorder (QAR).

However, recording a portion of the engine data utilizing either the data recorder or the quick access recorder can be problematic. For example, known aircraft do not include a system that is configured to automatically download the engine data from the aircraft to a ground facility. Therefore, the engine data is manually retrieved from either the aircraft data recorder or the quick access recorder. Moreover, known aircraft data recording devices have a limited capacity such that only a portion of the engine data, collected during a limited quantity of flights, can be recorded at a given time. Therefore, known data recorders are configured to sample only a portion of the engine data that is available on a limited quantity of flights. Accordingly, only a limited quantity of the data available from the gas turbine engine, is utilized to calculate stresses and lives of the individual gas turbine life limited parts.

BRIEF DESCRIPTION OF THE INVENTION

In one aspect, a method for determining an engine part life usage of a gas turbine engine life limited part used on an aircraft is provided. The method includes operating a gas turbine engine that includes a plurality of rotating components and a plurality of sensors configured to monitor a plurality of gas turbine engine operating parameters, obtaining outputs from the plurality of sensors, and utilizing at least some of the outputs to calculate the life usage of at least one life limited part to facilitate tracking the life-usage of an individual life limited part on the gas turbine engine that is consumed on a flight by flight basis.

In another aspect, a control system coupled to a gas turbine engine is provided. The gas turbine engine includes a plurality of life limited parts, and a plurality of sensors configured to monitor a plurality of gas turbine engine operating parameters. The control system is configured to operate the gas turbine engine, obtain outputs from the plurality of sensors, and utilize at least some of the outputs to calculate the life usage of at least one of said life limited parts to facilitate tracking the life-usage of an individual life limited part on the gas turbine engine that is consumed on a flight by flight basis.

DETAILED DESCRIPTION OF THE INVENTION

Figure 1:
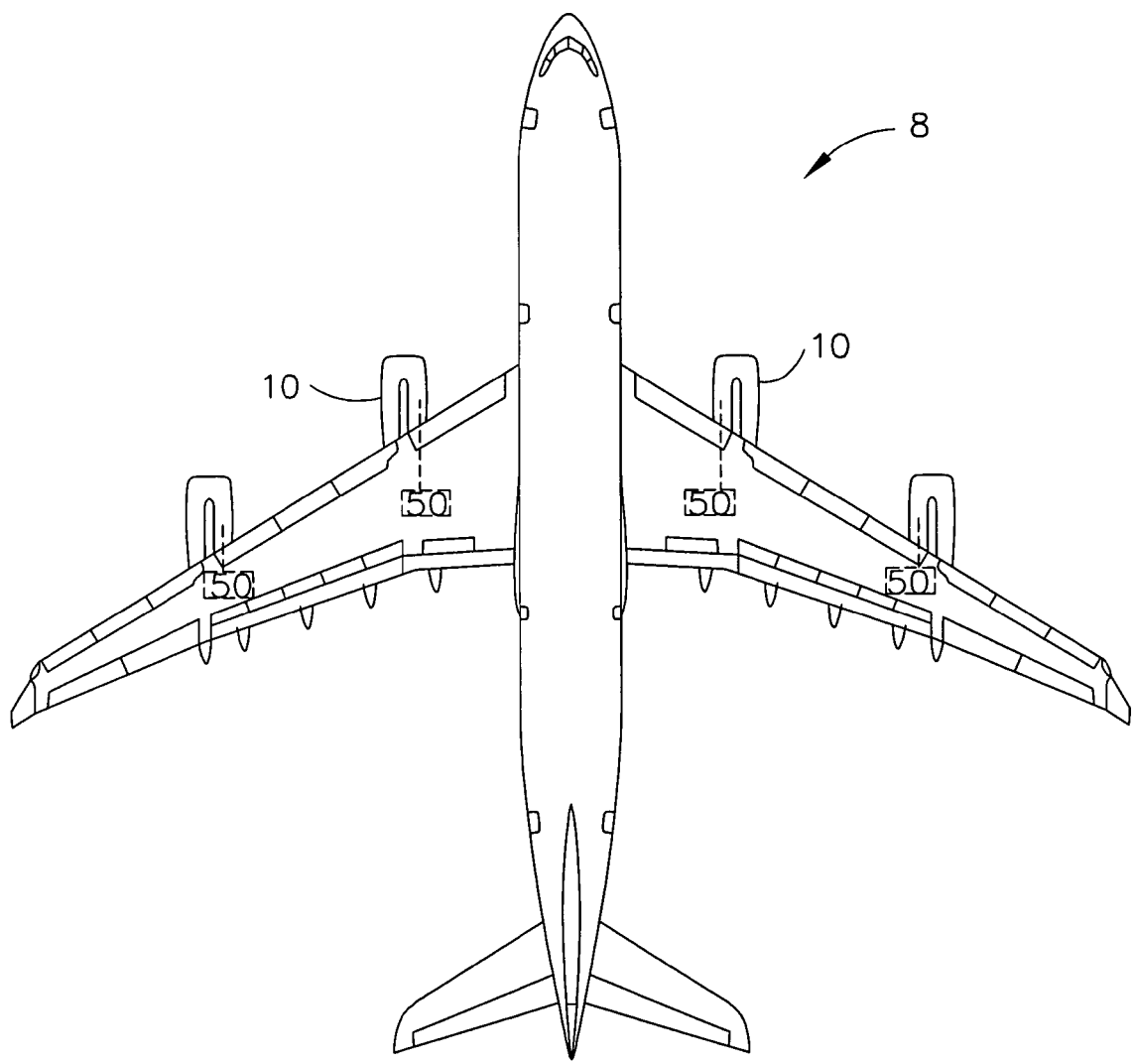
FIG. 1 is a perspective view of an exemplary aircraft.
Figure 2:
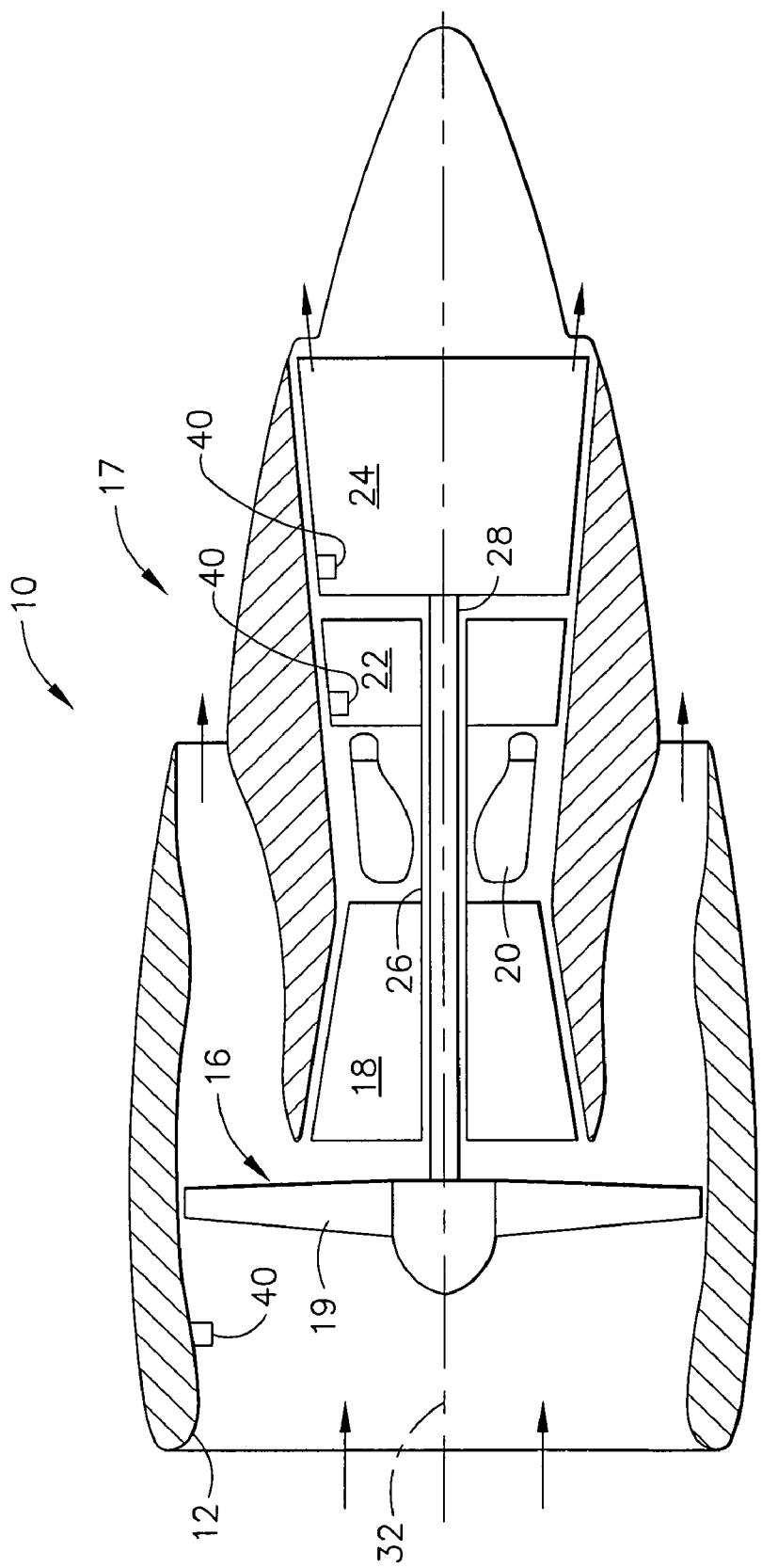
FIG. 2 is a cross-sectional view of a portion of an exemplary gas turbine engine that can be used with the aircraft shown in FIG. 1.

FIG. 1 is a schematic illustration of an exemplary aircraft 8 that includes at least one gas turbine engine assembly 10 that is installed on aircraft 8. FIG. 2 is a cross-sectional view of a portion of exemplary gas turbine engine 10 (shown in FIG. 1).

In the exemplary embodiment, gas turbine engine 10 includes a fan assembly 16 disposed about a longitudinal centerline axis 32. In one embodiment, fan assembly 16 is positioned at a forward end of gas turbine engine 10 as illustrated. In an alternative embodiment, fan assembly 16 is positioned at an aft end of gas turbine engine 10. Fan assembly 16 includes a plurality of rows of fan blades 19 positioned within a nacelle 12.

Gas turbine engine 10 also includes a core gas turbine engine 17 that is downstream from fan assembly 16. Core engine 17 includes a high-pressure compressor (HPC) 18, a combustor 20, and a high-pressure turbine (HPT) 22 that is coupled to HPC 18 via a core rotor shaft 26. In operation, core engine 17 generates combustion gases that are channeled downstream to a counter-rotating low-pressure turbine 24 which extracts energy from the gases for powering fan assembly 16 through a shaft 28.

Figure 3:
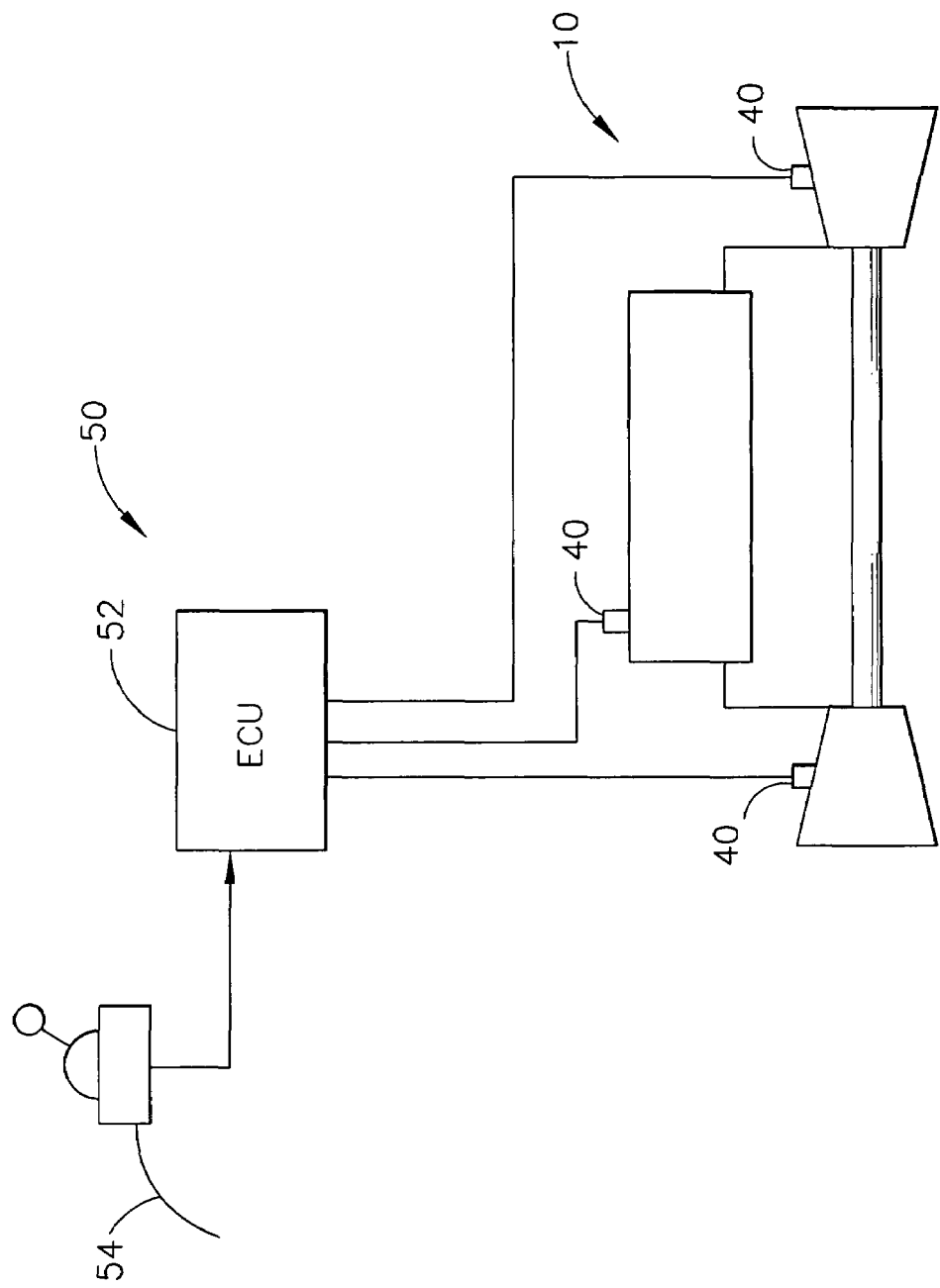
FIG. 3 is a schematic illustration an exemplary Engine Control System that can be used with the gas turbine engine shown in FIG. 2.

FIG. 3 is a simplified schematic illustration of an exemplary Engine Control System 50 that is installed on and coupled to gas turbine engine 10. In the exemplary embodiment, engine control system 50 includes an electronic control unit (ECU) 52 such as a Full Authority Digital Engine Control (FADEC), or a Modernized Digital Engine Control (MDEC). In an alternative embodiment, engine control system 50 includes any engine controller that is configured to send and/or receive signals from gas turbine engine 10. As used herein, an ECU can be any electronic device that resides on or around an engine and includes at least one of software and/or hardware that is programmed to control and/or monitor gas turbine engine 10. Conventional engine data sensors 40 and aircraft data sensors (not shown) are provided to sense selected data parameters related to the operation of gas turbine engine 10 and aircraft 8. In the exemplary embodiment, such data parameters can include aircraft parameters such as altitude, ambient temperature, ambient pressure and air speed, and engine parameters such as exhaust gas temperature, oil temperature, engine fuel flow, core gas turbine engine speed, compressor discharge pressure, turbine exhaust pressure, fan speed, and/or a plurality of other signals received from gas turbine engine 10, for example. The ECU 52 receives signals from the engine and aircraft data sensors 40. The ECU 52 also receives a thrust request signal from a throttle 54 that is controlled by the aircraft's pilot.

Although only a few engine sensors 40 are shown, it should be realized that gas turbine engine 10 can include a plurality of engine sensors 40 that are each configured to sense a respective temperature, pressure, flow, speed and/or a plurality of other operational parameters within gas turbine engine 10.

Additionally, although the herein described methods and apparatus are described in an aircraft setting, it is contemplated that the benefits of the invention accrue to those systems typically employed in an industrial setting such as, for example, but not limited to, power plants. Accordingly, and in the exemplary embodiment, gas turbine engine 10 and engine control system 50 are coupled to a vehicle such as aircraft 8, such that information collected by system 50 is either stored in ECU 52 on aircraft 8, or alternatively, the information is transmitted to a ground facility and downloaded onto a local computer (not shown). In an alternative embodiment, gas turbine engine 10 and system 50 are installed in a ground facility such as a power plant, for example.

Figure 4:
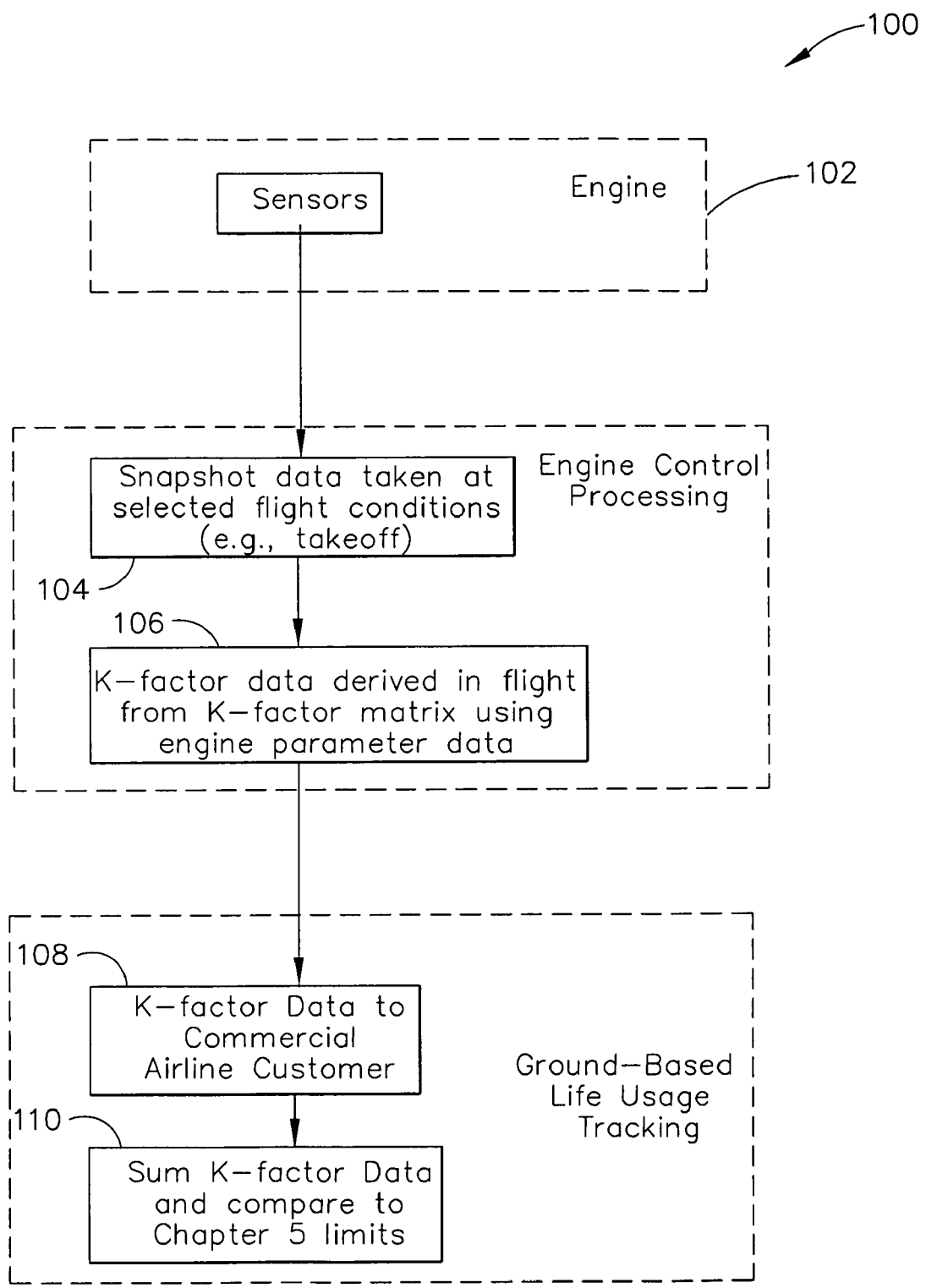
FIG. 4 is flowchart illustrating an exemplary method of calculating the life usage of a gas turbine engine life limited part.

FIG. 4 is a flow chart illustrating an exemplary method 100 for collecting and processing part life tracking data. In the exemplary embodiment, system 50 includes the hardware and software for gathering and processing the data that is generated by gas turbine engine 10 utilizing sensors 40. Method 100 includes acquiring 102 real time flight data from gas turbine engine 10, and storing at least a portion of the real time data within system 50, generating 104 a snapshot of data at selected flight conditions, deriving 106 a K-factor in flight for each life limited part utilizing a K-factor matrix, providing 108 the K-factor data to a customer such that the customer can sum 110 the K-factor data, and compare the summed K-factor data to the approved Chapter 5 guideline limits for each life limited part.

More specifically, a plurality of flight parameters, i.e. the data, is acquired from plurality of sensors 40 that are coupled to gas turbine engine 10. In the exemplary embodiment, all sensor data that is generated utilizing sensors 40 is stored in system 50 for at least one flight, and in the exemplary embodiment, for a plurality of flights. Accordingly, and in the exemplary embodiment, sensors 40 are not periodically sampled, rather a substantially continuous data stream is channeled from sensors 40 to system 50 such that substantially all the signals, i.e. flight parameters, generated by gas turbine engine 10 during all flight conditions, can be collected, processed, and utilized as part of the life tracking data in accordance with the methods described herein.

In one exemplary embodiment, a plurality of data snapshots are acquired using system 50. More specifically, data snapshots are a set of gas turbine engine parameters that are acquired at certain operational points, or phases, within the flight mission. For example, in the exemplary embodiment, a data snapshot may be acquired when the gas turbine engine is intially started, during the aircraft takeoff phase, during the cruise mode, during aircraft landing phase, and prior to stopping the gas turbine engine, for example. Accordingly, a plurality of snapshots are acquired using system 50 during various aircraft operational modes and stored within system 50, wherein each snapshot includes a predetermined set of parameters that can be utilized as part life tracking data in accordance with the methods described herein.

In the exemplary embodiment, the snapshots are then utilized during each flight to assess the severity of each flight. More specifically, the parameters within each snapshot are compared to data stored within a matrix within system 50. For example, in the exemplary embodiment, at least one gas turbine engine parameter is channeled from a respective snapshot and input into the matrix. The matrix compares the parameter to a predetermined value within the matrix and outputs a K-factor. K-factor as used herein is defined as a measure of the severity of the flight, i.e. the life usage of an individual gas turbine engine life limited part. In the exemplary embodiment, a plurality of parameters generated by each snapshot are input into the matrix such that a single K-factor is generated for each life limited part. Accordingly, a K-factor is generated for each predetermined gas turbine engine life limited part that is indicative of the life usage of the respective life limited part that was consumed during the flight. More specifically, a K-factor that relates the assessed severity for each life limited part to the measured data is generated by reading the K-factor value directly from a life usage matrix stored in system 50.

For example, at least one known method of tracking gas turbine part life usage, assigns a "cycle" value to each part, wherein the cycle value is equivalent to one flight. More specifically, each time the aircraft is operated, the part cycle value is incremented by one, such that ten flights equals ten cycles, for example. The cycle values are then compared to predetermined cycle limits within the Federal Aviation Administration (FAA) approved Engine Manual Chapter 5 guidelines, for example. Under the approved FAA guidelines, the life limited part must be replaced after a predetermined quantity of cycles.

Accordingly, known methods of tracking engine part life usage utilize cycles which may or may not be indicative of the actual life usage of the engine part. Whereas the methods described herein assign a K-factor to each engine life limited part after each flight, wherein the K-factor is indicative of the life usage of the respective life limited part that was consumed during the flight. For example, when the gas turbine engine is operated in relatively severe conditions during the flight, a K-factor of "1" may be assigned to each engine life limited part during the flight. Alternatively, if the gas turbine engine is operated in relatively mild conditions, a K-factor of "0.5" may be assigned to each engine life limited part during the flight.

In the exemplary embodiment, the K-factors are downloaded to a ground facility after each flight. Alternatively, the K-factors are stored within system 50 for a plurality of flights and then downloaded to the ground facility at a desired time. In the exemplary embodiment, the K-factors are downloaded from system 50 to a memory device installed on aircraft 8 using an Avionics Full Duplex Switched (AFDX) Ethernet or a databus, for example. The data is then downloaded from the memory device to the ground station utilizing a wireless gate link, for example. In an alternative embodiment, the K-factors are downloaded from system 50 to the ground station utilizing a hardwired connection.

In the exemplary embodiment, the K-factors are summed together for each life limited part and compared to the FAA Chapter 5 approved guidelines for each life limited part to facilitate determining when the life limited part should be repaired and/or replaced. For example, and in the exemplary embodiment, a customer stores the K-factors generated for each life limited part during each flight. The customer then adds the K-factors generated for each part to facilitate determining the life usage of the respective life limited part that was consumed during a plurality of flights. Accordingly, the K-factors facilitate providing a customer with the ability to accurately track and/or estimate the life consumption of an individual part on the gas turbine engine. Moreover, generating and utilizing K-factors facilitate potentially reducing repair and maintenance costs by accurately determining when the part requires maintenance and/or repair rather than relying on the simple cycle count as utilized in known systems.

More specifically, the method and system described herein is configured such that a customer can track cumulative K-factor cycles for each gas turbine engine life limited part after each flight and compare the number of cycles to the FAA approved Chapter 5 manual limit. In the current life tracking process, all flights count as 1. However, utilizing K-factors, each flight gets a K-factor that represents actual severity. Flights with lower severity based on the measured parameters will have lower K-factors. Moreover, the value of the K-factor can vary over a range, thus representing the severity of different flights. Accordingly, customers will be able to fly more flights before replacing life-limited engine parts because K-factors are typically less than 1 and customers will be counting K-factors, not flights.

Figure 5:
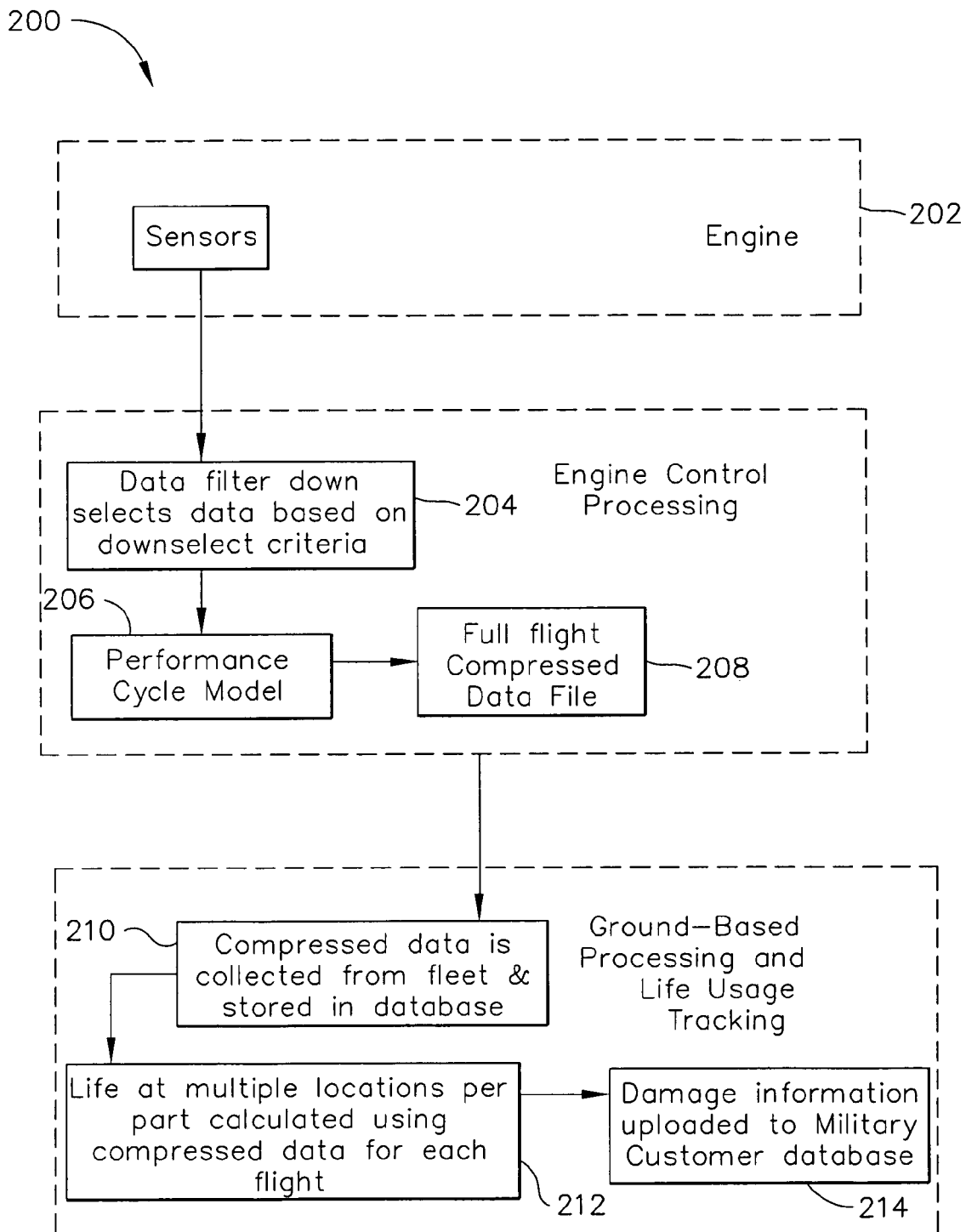
FIG. 5 is flowchart illustrating an exemplary method of calculating the life usage of a gas turbine engine life limited part.

FIG. 5 is a flow chart illustrating an exemplary method 200 for collecting and processing part life tracking data. In the exemplary embodiment, system 50 includes the hardware and software for gathering and processing the data that is generated by gas turbine engine 10 utilizing sensors 40. In the exemplary embodiment, method 200 includes acquiring 202 real time flight data from gas turbine engine 10, utilizing 204 a filter to down-select data based on the down-select criteria, entering 206 the data into a flight performance model, compressing 208 the data collected during the flight and the flight performance model calculated data into a compressed engine data file, referred to hereafter as "engine data". In the exemplary embodiment, the flight performance model is configured to receive real time flight data, and then calculate additional engine parameters that are not sensed by sensors 40. Method 200 also includes downloading 210 the engine data from the aircraft to the ground facility, utilizing 212 the engine data to calculate the life of a plurality of life limited parts at a plurality of locations per part, and uploading 214 the life usage information to a customer database.

More specifically, a plurality of flight parameters, i.e. the data, is acquired from a plurality of sensors 40 coupled to gas turbine engine 10. In the exemplary embodiment, that data is collected for an entire flight and stored within system 50 on a predetermined time frame based on a down-selection criteria. Down-selection criteria as used herein is defined as a predefined event has occurred. For example, in the exemplary embodiment, the down-selection criteria may be defined as a throttle movement or a change in a sensed parameter. Alternatively, the down-selection criteria may be any user defined event in which the user desires that the data collected from gas turbine engine 10 be downloaded to system 50.

In the exemplary embodiment, all the sensors 40 coupled to gas turbine engine 10 are automatically sampled approximately every second throughout the duration of the flight. System 50 then determines whether the down-selection criteria is true. For example, system 50 periodically determines whether an operator has repositioned the throttle assembly 54 on the aircraft. If the operator has not repositioned the throttle assembly 54 since the last stored data point, i.e. down-selection criteria is false, the data is not stored. However, if system 50 determines that the throttle assembly 54 has been repositioned since the last stored data point, i.e. down-selection criteria is true, then the data is stored within system 50. Once a true criteria is established, stored data is processed through a performance cycle model to calculate additional engine parameters that will be used to calculate life usage of the limited life part. This process is continued throughout the flight.

After the flight is completed, the engine data stored within system 50, representing the engine data collected during each down-selection criteria and the performance model data, is transmitted to a ground based facility. More specifically, and in the exemplary embodiment, the data is downloaded from the aircraft utilizing an Ethernet port, for example. In the exemplary embodiment, the Ethernet port is coupled to the aircraft wheelwell via a cable to facilitate providing easy access to the stored data.

In the exemplary embodiment, a user, such as the wing commander for example, couples a portable electronic device, such as a laptop computer to the wheel well access port to facilitate downloading the data. The data is then downloaded to the portable device for further processing.

More specifically, the data is utilized to determine the life usage that has occurred to the life limited gas turbine engine parts during the flight. For example, in the exemplary embodiment, the stored data, i.e. the engine parameters, are utilized to assess the severity of the flight. Production life models will determine the associated life usage for each life limiting location on each life limited part and store the information in a customer database.

While the invention has been described in terms of various specific embodiments, those skilled in the art will recognize that the invention can be practiced with modification within the spirit and scope of the claims.

What is claimed is:

1. A method for determining an engine part life usage of a gas turbine engine life limited part used on an aircraft, said method comprising:

operating a gas turbine engine that includes a plurality of rotating components and a plurality of sensors configured to monitor a plurality of gas turbine engine operating parameters;

continuously sampling the plurality of sensors during each flight using an engine control system coupled to the gas turbine engine;

obtaining outputs from the plurality of sensors;

sorting the sensor outputs based on predefined events using the engine control system;

transmitting at least some of the sorted sensor outputs to a remote server for viewing by at least one customer; and utilizing the at least some of the sorted outputs to calculate the life usage of at least one life limited part to facilitate tracking the life-usage of an individual life limited part on the gas turbine engine that is consumed on a flight by flight basis.

2. A method in accordance with claim 1 further comprising:
　　acquiring at least one data snapshot during engine operation, wherein the data snapshot includes a plurality of engine parameters collected at a single time interval; and
　　storing the data snapshot within a computer that is coupled to the gas turbine engine.

3. A method in accordance with claim 2 further comprising
　　comparing at least one parameter within the data snapshot to a known value during the flight; and
　　outputting a K-factor for each life limited part based on the at least one parameter.

4. A method in accordance with claim 3 wherein comparing at least one parameter within the data snapshot to a known value further comprises:
　　comparing the at least one parameter to a predetermined value stored within a matrix; and
　　outputting a K-factor based on the comparison on each flight.

5. A method in accordance with claim 3 further comprising:
　　summing a plurality of K-factors generated for a single life limited part; and
　　comparing the summed K-factors to a predetermined limit to facilitate tracking the life-usage of individual life limited parts.

6. A method in accordance with claim 1 further comprising:
　　determining a down select criteria;
　　filtering the plurality of outputs to determine if the down select criteria is true;
　　downloading the plurality of outputs into a computer that is coupled to the gas turbine engine if the down select criteria is true; and
　　compressing the downloaded plurality of outputs into a single data file that is stored within the computer that is installed on the aircraft.

7. A method in accordance with claim 6 further comprising:
　　inputting the plurality of outputs into a performance cycle model;
　　combining the performance model and the plurality of outputs into a single data file; and
　　compressing the performance model calculated data and the plurality of outputs into a single data file that is stored within the computer that is installed on the aircraft.

8. A method in accordance with claim 6 further comprising:
　　transferring the compressed file to a ground based facility; and
　　utilizing the compressed file to facilitate tracking the life usage of individual life limited parts on the gas turbine engine.

9. A method in accordance with claim 8 further comprising:
　　transferring the compressed file to a ground based facility; and
　　utilizing the compressed file to facilitate tracking the life usage of individual life limited parts on the gas turbine engine on a flight by flight basis.

10. A method in accordance with claim 9 further comprising:
　　generating a plurality of compressed files; and
　　providing the compressed files to a customer to facilitate assessing the cumulative life usage of a plurality of life limited parts.

11. A control system coupled to a gas turbine engine, wherein the gas turbine engine includes a plurality of life limited parts, and a plurality of sensors configured to monitor a plurality of gas turbine engine operating parameters, said control system is configured to:
　　operate the gas turbine engine;
　　continuously sample the plurality of sensors during each flight using said control system coupled to the gas turbine engine;
　　obtain outputs from the plurality of sensors;
　　sort the sensors outputs based on predefined events using said control system;
　　transmit at least some of the sorted sensor outputs to a remote server for viewing by at least one customer; and
　　utilize the at least some of the sorted outputs to calculate the life usage of at least one of said life limited parts to facilitate tracking the life-usage of an individual life limited part on the gas turbine engine that is consumed on a flight by flight basis.

12. A control system in accordance with claim 11, wherein said control system is further configured to:
　　acquire at least one data snapshot during engine operation, wherein said data snapshot includes a plurality of engine parameters collected at a single time interval; and
　　store said data snapshot within said control system.

13. A control system in accordance with claim 12, wherein said control system is further configured to:
　　compare at least one parameter within said data snapshot to a known value during the flight; and
　　output a K-factor for each life limited part based on the at least one parameter.

14. A control system in accordance with claim 13, wherein said control system is further configured to:
　　compare the at least one parameter to a predetermined value stored within a matrix; and
　　output a K-factor based on the comparison on each flight.

15. A control system in accordance with claim 13, wherein said control system is further configured to:
　　download a plurality of K-factors generated for a single life limited part such that a customer can sum the plurality of K-factors and compare the summed K-factors to a predetermined limit to facilitate tracking the life-usage of individual life limited parts.

16. A control system in accordance with claim 11, wherein said control system is further configured to:
　　receive a down select criteria;
　　filter the plurality of outputs to determine if the down select criteria is true;
　　download the plurality of outputs into a computer that is coupled to the gas turbine engine if the down select criteria is true; and
　　compress the downloaded plurality of outputs into a single data file that is stored within said computer that is installed on the aircraft.

17. A control system in accordance with claim 16, wherein said control system is further configured to:
  input the plurality of outputs into a performance cycle model;
  combine the performance model calculated data and the plurality of outputs into a single data file; and
  compress the performance model calculated data and the plurality of outputs into a single data file that is stored within the computer that is installed on the aircraft.

18. A control system in accordance with claim 16, wherein said control system is further configured to:
  transfer the compressed file to a ground based facility such that a customer can utilize the compressed file to facilitate tracking the life-usage of individual life limited parts on the gas turbine engine.

19. A control system in accordance with claim 16, wherein said control system is further configured to:
  transfer the compressed file to a ground based facility such that a customer can utilize the compressed file to facilitate tracking the life usage of individual life limited parts on the gas turbine engine on a flight by flight basis.

20. A control system in accordance with claim 19, wherein said control system is further configured to generate a plurality of compressed files to facilitate a customer assessing the cumulative life usage of a plurality of life limited parts.

* * * * *